Dec. 27, 1927.
H. B. BABSON
1,653,756
PAIL COVER FOR MILKING MACHINES
Filed May 2, 1925
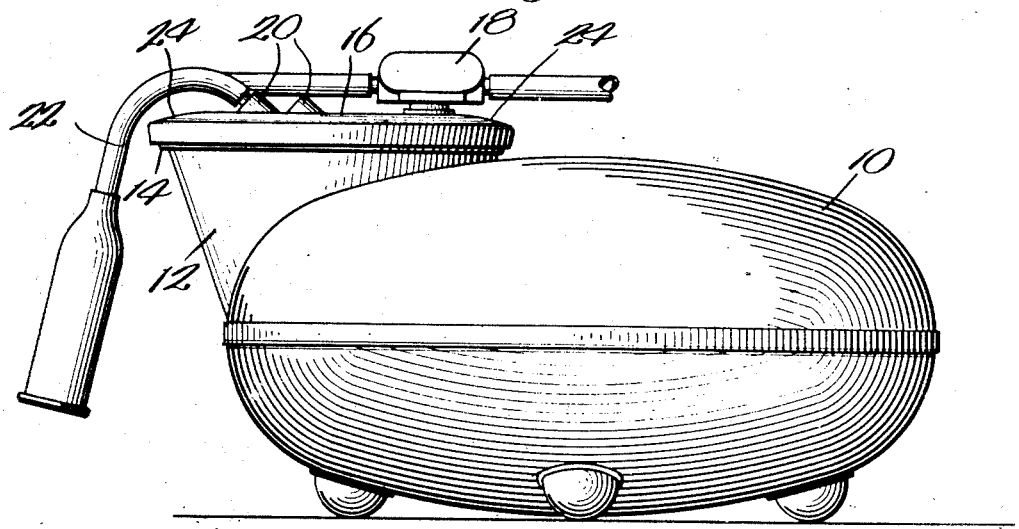
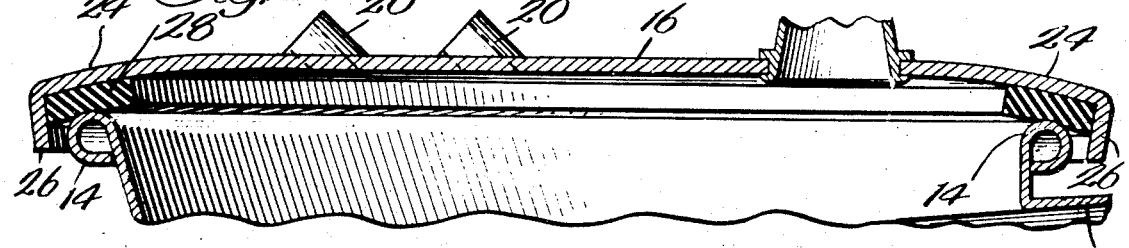
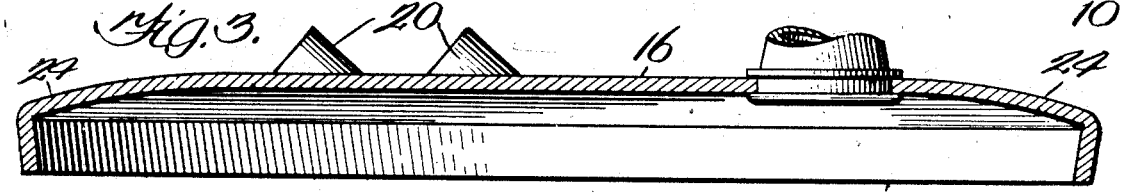
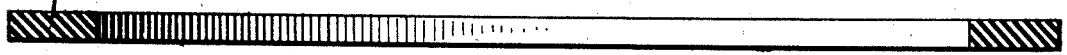
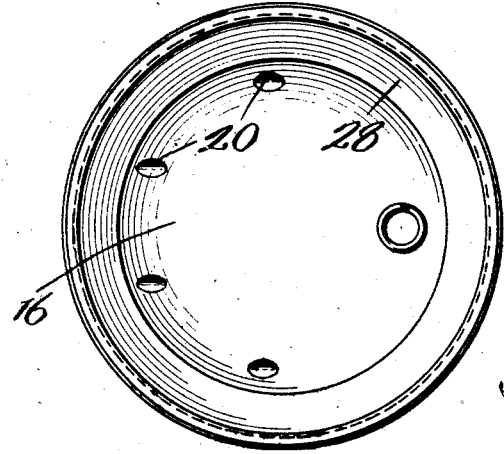
Inventor:
Henry B. Babson
By Cheever + Cox
Attys Patented Dec. 27, 1927.

1,653,756

UNITED STATES PATENT OFFICE.

HENRY B. BABSON, OF CHICAGO, ILLINOIS, ASSIGNOR TO PINE TREE MILKING MACHINE COMPANY, OF CHICAGO, ILLINOIS, A CORPORATION OF ILLINOIS.

PAIL COVER FOR MILKING MACHINES.

Application filed May 2, 1925. Serial No. 27,390.

My invention relates to milk pail covers, especially for milking machines, and the general object of the invention is to provide convenient and efficient means for making an air-tight connection between the pail and the cover. This is accomplished by means of a gasket, and while gaskets have been employed for this purpose heretofore my object is to improve the construction and make it possible to cause the gasket to maintain itself on the cover without the need of grooves or recesses, which are objectionable in view of the difficulty of keeping them clean and because of the cost of manufacture. My purpose is to provide a simple construction which is cheap to produce and easy to clean, and in which it is easy to remove or replace the gasket. Another object is to provide a construction such as to prolong the life of the gasket.

I accomplish my objects in the manner illustrated in the accompanying drawings in which Figure 1 is a side elevation of a milk pail and cover embodying the invention.

Figure 2 is a sectional elevation showing the cover, gasket and upper portion of the pail on an increased scale.

Figure 3 is similar to Figure 2 but shows the cover alone.

Figure 4 is an axial sectional view of the gasket.

Figure 5 is a bottom plan view of the cover with the gasket in place.

Like numerals denote like parts throughout the several views.

According to the design illustrated, the pail has a body 10 with a riser 12 at one point, the latter having a circular upper rim 14. In the form shown the body of the pail simulates an oblate spheroid, but it will be understood that the configuration of the pail is immaterial so long as it has an opening of circular outline adapted to cooperate with the gasket. The pail cover 16 is equipped with a pulsator 18 and nipples 20 for connection to the teat cups 22, but these parts also may be greatly varied without omitting the essence of the invention.

Referring now more particularly to the novel characteristics, the pail cover, which is preferably of sheet metal, is slightly crowned near the periphery as indicated at 24 in Figures 2 and 3. At the periphery is a depending flange 26 which converges downward and inward, thus producing a tapered or conical inner surface, and the internal surface of the flange being approximately at right angles to the adjacent crowned under surface of the cover.

The gasket 28 is shown separately in Figure 4. It is usually formed in whole or in part of rubber, is annular in outline and rectangular in cross section, the rectangle being elongated in the plane of the gasket.

When the parts are configurated in this manner and the gasket has been placed in position within the cover the flanges 26 tilt the gasket in the manner shown in Figure 2, thus causing it to be held up in contact with the under surface of the cover. In other words the gasket is sprung slightly out of shape and is enabled to securely hold its position on the under side of the cover without the aid of any fastening devices. It remains snugly in position, and the result is that the cover may be removed with the pail and the gasket will follow it. Thus the gasket is self-retaining in view of the shape of the rim of the cover, and yet the cover is quite free from annular grooves or recesses of any kind.

When it is desired to clean the parts the gasket may be readily lifted out of the cover without stretching it or subjecting it to strain of any kind, and when it has been removed the pail will present a smooth and readily accessible under surface which may be thoroughly washed with very little effort.

According to my construction the gasket is retained by pressure upon its outer rim, whereas in many prior constructions the gasket had to be stretched before it could be snapped into the recess in which it seated when in use. Rubber tends to deteriorate from contact with the milk, and the deterioration is accelerated when it is necessary to stretch the gasket each time it is replaced or removed in an annular groove. With my construction stretching is not necessary at any time, and the result is that the life of the gasket is prolonged.

It will be observed that this invention does not call for any special formation of gasket or pail, but makes use of a gasket of ordinary annular form and rectangular cross section.

Having thus described my invention what

I claim as new and desire to secure by Letters Patent is:

1. In combination with a milk pail, a cover therefor having an annular elastic gasket adapted to be detachably connected to said cover, said gasket being rectangular in cross section, said closure having a flanged wall in the form of a section of a cone whereby the engagement of the gasket with the inner surface of the cone, due to the elasticity of the gasket, tends to maintain said gasket in firm engagement with said cover while permitting its free detachability for cleaning and other purposes.

2. A container closure having a peripheral flange extending at such an angle to the top of the closure as to form the inner surface of a cone and an elastic gasket having its outer upper wall and its adjacent side wall disposed at right angles with respect to each other, whereby said conical surface of the flange engages said gasket and holds it firmly to the under side of the cover while permitting the free detachability of the gasket from the cover.

3. A cover of the character indicated, consisting of sheet metal and formed with a slightly crowned portion at its periphery and terminating in a depending flange converging inwardly and downwardly to produce a tapered and conical inner surface, the internal surface of which flange is approximately at right angles to the adjacent crowned under surface of the cover and an elastic annulus substantially rectangular in cross section, said gasket having its upper and outer faces contacting with the crowned and flanged portions of the cover whereby to hold the gasket firmly but detachably in position.

4. A container closure comprising a top portion having a peripheral flange extending downwardly and inwardly so that the inner face of the flange forms a section of a cone, and an elastic gasket having an outer straight edge adapted to fit snugly against the conical face of the flange whereby said gasket is slightly deformed and firmly grips said cover and is maintained detachably connected thereto.

In witness whereof, I have hereunto subscribed my name.

HENRY B. BABSON.